(12) United States Patent
Hirai et al.

(10) Patent No.: US 12,475,960 B2
(45) Date of Patent: Nov. 18, 2025

(54) SEMICONDUCTOR STORAGE DEVICE

(71) Applicant: Kioxia Corporation, Tokyo (JP)

(72) Inventors: Ryota Hirai, Chigasaki Kanagawa (JP); Yasuhiro Shiino, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 135 days.

(21) Appl. No.: 18/163,846

(22) Filed: Feb. 2, 2023

(65) Prior Publication Data

US 2024/0087659 A1    Mar. 14, 2024

(30) Foreign Application Priority Data

Sep. 12, 2022   (JP) .................. 2022-144308

(51) Int. Cl.
| | |
|---|---|
| G11C 16/34 | (2006.01) |
| G11C 11/56 | (2006.01) |
| G11C 16/10 | (2006.01) |
| G11C 16/16 | (2006.01) |
| G11C 16/04 | (2006.01) |
| G11C 16/20 | (2006.01) |

(52) U.S. Cl.
CPC .......... *G11C 16/3495* (2013.01); *G11C 16/10* (2013.01); *G11C 16/16* (2013.01); *G11C 16/3459* (2013.01)

(58) Field of Classification Search
CPC ..... G11C 16/3495; G11C 16/10; G11C 16/16; G11C 16/3459; G11C 11/5628; G11C 11/5635; G11C 16/0483; G11C 16/20
See application file for complete search history.

(56) References Cited

U.S. PATENT DOCUMENTS

| | | | |
|---|---|---|---|
| 8,085,586 B2 | 12/2011 | Golov et al. | |
| 8,755,233 B2 | 6/2014 | Nagashima | |
| 8,804,435 B2 | 8/2014 | Matsunaga | |
| 2009/0168524 A1* | 7/2009 | Golov | G11C 16/349 |

FOREIGN PATENT DOCUMENTS

| | | | |
|---|---|---|---|
| JP | 2013-122793 A | 6/2013 | |
| JP | 5364750 B2 | 12/2013 | |

* cited by examiner

*Primary Examiner* — Son T Dinh
*Assistant Examiner* — Elizabeth Rose Agger
(74) *Attorney, Agent, or Firm* — Kim & Stewart LLP

(57) ABSTRACT

A semiconductor storage device that is capable of improving reliability includes: a non-volatile memory provided with a block including a plurality of memory cell transistors connected to a word line; and a controller configured to monitor a threshold voltage distribution width of the plurality of memory cell transistors after performing at least one of an erasing operation on the block and a preliminary write operation on the plurality of memory cell transistors and to classify the plurality of memory cell transistors according to the threshold voltage distribution width of the plurality of memory cell transistors.

8 Claims, 9 Drawing Sheets

FIG. 5
|  | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| "A" STATE (VfyA) | O | O | O | O | O | | | | | | | | | | | | | | |
| "B" STATE (VfyB) | | | O | O | O | O | O | O | | | | | | | | | | | |
| "C" STATE (VfyC) | | | | | O | O | O | O | O | O | | | | | | | | | |
| "D" STATE (VfyD) | | | | | | | O | O | O | O | O | O | | | | | | | |
| "E" STATE (VfyE) | | | | | | | | | O | O | O | O | O | O | | | | | |
| "F" STATE (VfyF) | | | | | | | | | | | O | O | O | O | O | O | | | |
| "G" STATE (VfyG) | | | | | | | | | | | | | | O | O | O | O | O | O |
FIG. 6
PRIOR ART
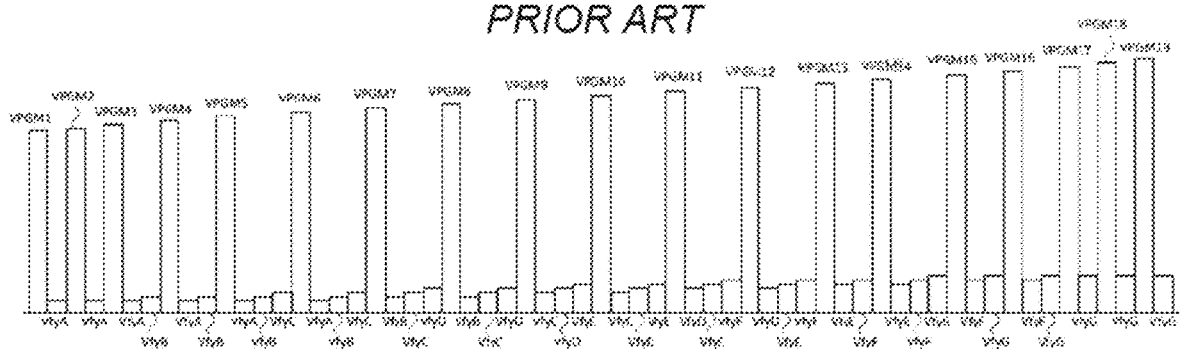
FIG. 7
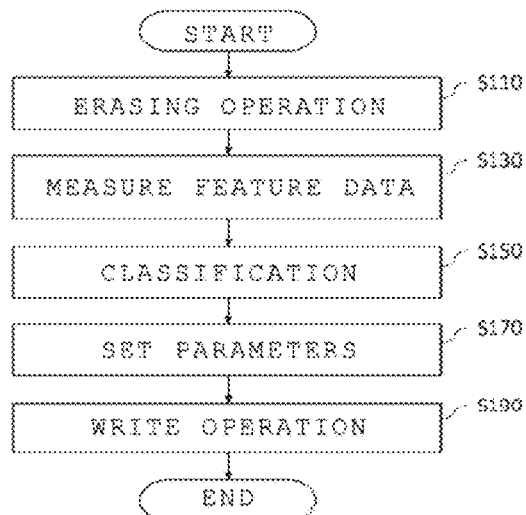

FIG. 8

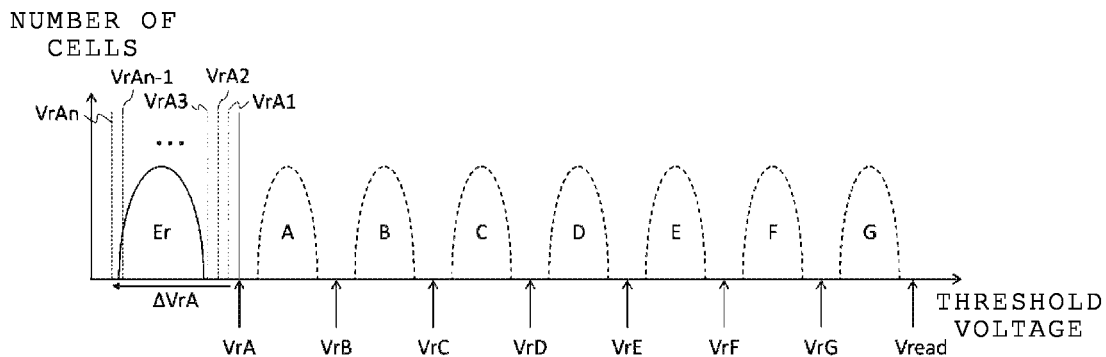

FIG. 9

| CELL UNIT CU | CLASSIFICATION |
|---|---|
| CU0 | FOURTH STATE |
| CU1 | SECOND STATE |
| CU2 | FIRST STATE |
| CU3 | THIRD STATE |
| CU4 | FIRST STATE |
| CU5 | FOURTH STATE |
| CU6 | THIRD STATE |
| CU7 | FIFTH STATE |

FIG. 10

| CLASSIFICATION | PARAMETER |
|---|---|
| FIRST STATE | OMIT ALL VERIFY OPERATIONS |
| SECOND STATE | ONLY VERIFY OPERATIONS OF "A" STATE AND "B" STATE |
| THIRD STATE | ONLY VERIFY OPERATIONS OF "A" STATE TO "D" STATE |
| FOURTH STATE | STANDARD WRITE OPERATION |
| FIFTH STATE | STANDARD WRITE OPERATION |

FIG. 11
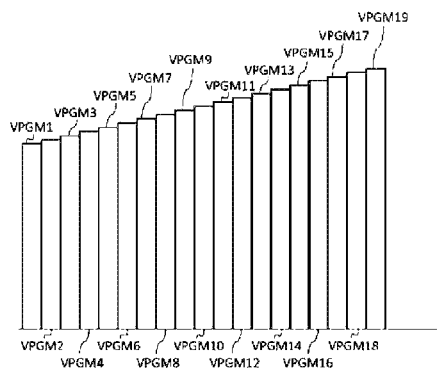
FIG. 12
|  | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| "A" STATE (VfyA) | ○ | ○ | ○ | ○ | ○ | ○ |  |  |  |  |  |  |  |  |  |  |  |  |  |
| "B" STATE (VfyB) |  |  | ○ | ○ | ○ | ○ | ○ | ○ |  |  |  |  |  |  |  |  |  |  |  |
FIG. 13
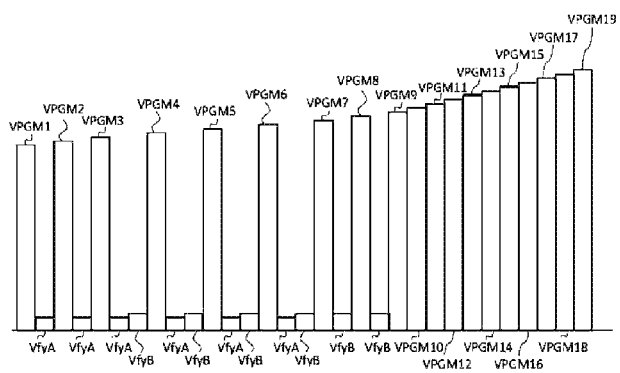
FIG. 14
|  | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| "A" STATE (VfyA) | ○ | ○ | ○ | ○ | ○ | ○ |  |  |  |  |  |  |  |  |  |  |  |  |  |
| "B" STATE (VfyB) |  |  | ○ | ○ | ○ | ○ | ○ | ○ |  |  |  |  |  |  |  |  |  |  |  |
| "C" STATE (VfyC) |  |  |  |  | ○ | ○ | ○ | ○ | ○ | ○ |  |  |  |  |  |  |  |  |  |
| "D" STATE (VfyD) |  |  |  |  |  |  | ○ | ○ | ○ | ○ | ○ | ○ |  |  |  |  |  |  |  |

FIG. 20
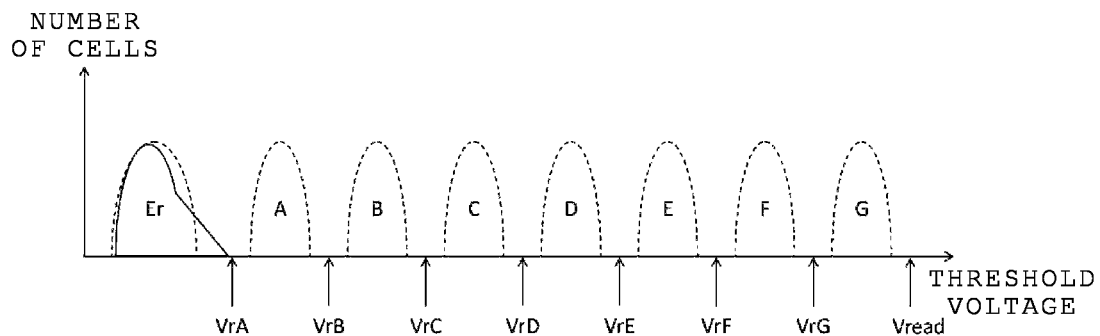
FIG. 21
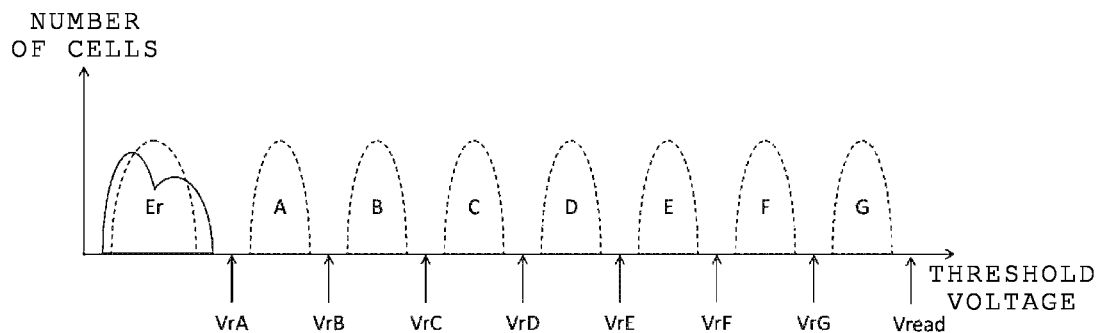
FIG. 22
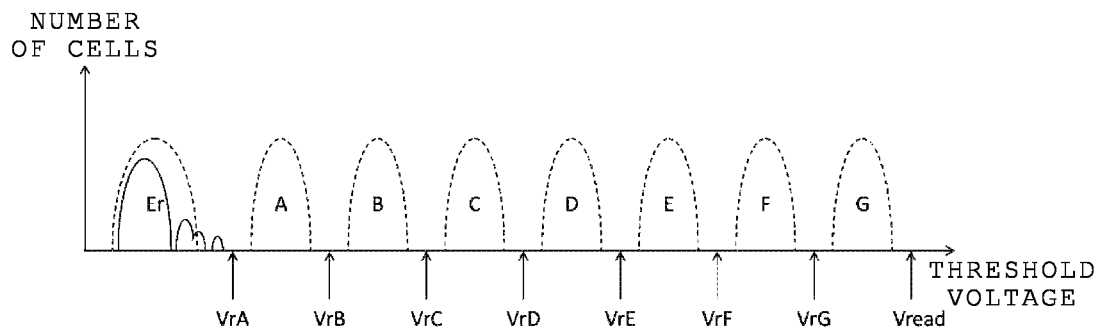
FIG. 23
| CLASSIFICATION | PARAMETER |
|---|---|
| FIRST STATE | VPGM |
| SECOND STATE | VPGM-Δ |
| THIRD STATE | VGPM-2Δ |
| FOURTH STATE | VPGM-3Δ |
| FIFTH STATE | VPGM-4Δ |

SEMICONDUCTOR STORAGE DEVICE

CROSS-REFERENCE TO RELATED APPLICATION

This application is based upon and claims the benefit of priority from Japanese Patent Application No. 2022-144308, filed Sep. 12, 2022, the entire contents of which are incorporated herein by reference.

FIELD

Embodiments described herein relate generally to a semiconductor storage device.

BACKGROUND

A non-volatile memory as a semiconductor storage device is known.

DESCRIPTION OF THE DRAWINGS

FIG. 5 is a diagram illustrating a relationship between the number of loops of a program operation and a verify operation in a standard write operation;

FIG. 6 is a diagram illustrating timings of the program operation and the verify operation in the standard write operation;

FIG. 7 is a flowchart of an erasing operation and a write operation according to the first embodiment;

FIG. 8 is a schematic diagram of a threshold voltage distribution of the non-volatile memory according to the first embodiment;

FIG. 9 is a table illustrating a deterioration degree management table according to the first embodiment;

FIG. 10 is a table illustrating a correspondence relationship between each classification and parameters according to the first embodiment;

FIG. 11 is a timing diagram of a program operation in a write operation based on a first state;

FIG. 12 is a diagram illustrating a relationship between a program operation and a verify operation during a write operation based on a second state;

FIG. 13 is a diagram illustrating timings of the program operation and the verify operation during the write operation based on the second state;

FIG. 14 is a diagram illustrating a relationship between a program operation and a verify operation in a write operation based on a third state;

FIG. 20 is a schematic diagram of a threshold voltage distribution of a non-volatile memory according to the second embodiment;

FIG. 21 is a schematic diagram illustrating different threshold voltage distributions of the non-volatile memory according to the second embodiment;

FIG. 22 is another schematic diagram of a threshold voltage distribution of the non-volatile memory according to the second embodiment;

FIG. 23 is a table illustrating a correspondence relationship between each classification and parameters according to a modification.

DETAILED DESCRIPTION

Figure 1:
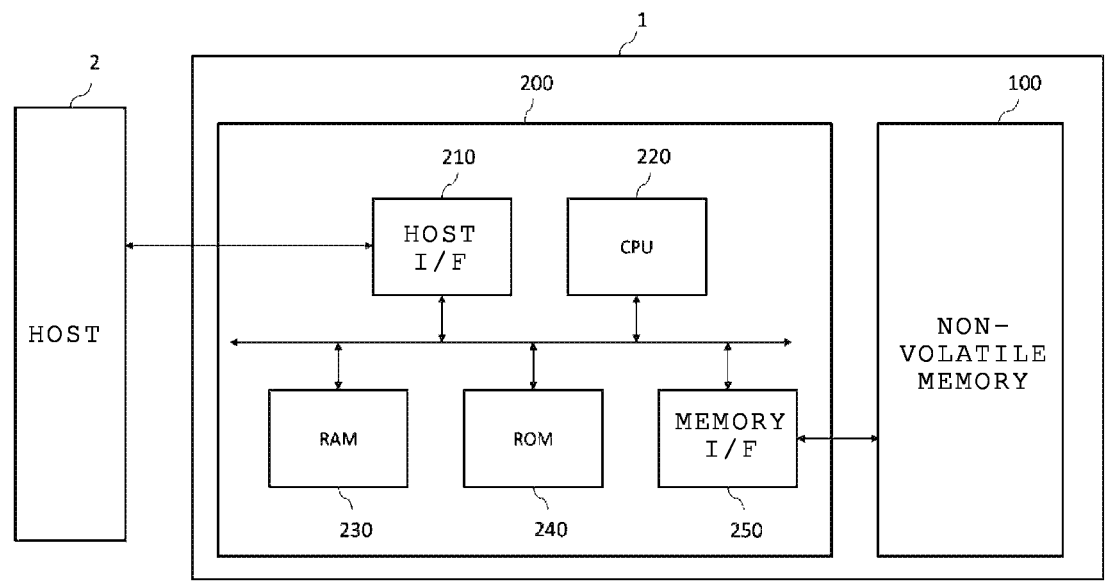
FIG. 1 is a block diagram illustrating a configuration of a memory system according to a first embodiment.

Embodiments provide a semiconductor storage device capable of improving reliability.

In general, according to one embodiment, a semiconductor storage device includes: a non-volatile memory provided with a block including a plurality of memory cell transistors connected to a word line; and a controller configured to monitor a threshold voltage distribution width of the plurality of memory cell transistors after performing at least one of an erasing operation on the block and a preliminary write operation on the plurality of memory cell transistors and to classify the plurality of memory cell transistors according to the threshold voltage distribution width of the plurality of memory cell transistors.

Hereinafter, embodiments for performing the present disclosure will be described with reference to the drawings. It is noted that the drawings are schematic, and in some cases, for example, the relationship between thickness and planar dimensions, the ratio of the thickness of each layer, and the like may differ from the actual ones. In addition, in the embodiments, substantially the same components are denoted by the same reference numerals, and descriptions thereof are omitted.

First Embodiment

As illustrated in FIG. 1, a memory system 1 includes a non-volatile memory 100 and a controller 200. The memory system 1 is controlled by a host 2. It is noted that the memory system 1 is an example of a semiconductor storage device. In addition, the non-volatile memory 100 is an example of a semiconductor storage device.

The controller 200 receives commands from the host 2 and controls operations of the non-volatile memory 100 based on the received commands. The controller 200 may be, for example, a portion of a control circuit. The controller 200 includes, for example, a host interface circuit (host I/F) 210, a Central Processing Unit (CPU) 220, a Random Access Memory (RAM) 230, a Read Only Memory (ROM) 240, and a memory interface circuit (memory I/F) 250. The controller 200 may be configured as, for example, a System on Chip (SoC).

The host I/F 210 is connected to the host 2 via a host bus. The host I/F 210 manages communication between the controller 200 and the host 2. The memory I/F 250 transmits and receives control signals between the controller 200 and the non-volatile memory 100. The memory I/F 250 is connected to the non-volatile memory 100 via a memory bus. The memory bus is, for example, a bus for transmitting and receiving signals conforming to a NAND interface.

The ROM 240 stores, for example, firmware. The RAM 230 can retain, for example, the firmware read from the ROM 240. The RAM 230 is used as a work area for the CPU 220. The RAM 230 temporarily stores data received from the host 2 and data read from the non-volatile memory 100 and functions as a buffer and cache.

The CPU 220 controls the entire operations of the memory system 1. The CPU 220 executes, for example, the firmware read from the ROM 240 to the RAM 230.

The non-volatile memory 100 is, for example, a NAND flash memory. It is noted that the non-volatile memory 100 is not limited to a NAND flash memory, and may be a NOR flash memory, a Magneto-resistive Random Access Memory (MRAM), a Phase change Random Access Memory (PRAM), a Resistive Random Access Memory (ReRAM), or a Ferroelectric Random Access Memory (FeRAM).

In addition, the non-volatile memory 100 also stores, for example, a deterioration degree management table. It is noted that the deterioration degree management table may be stored in the controller 200 or the host 2.

Figure 2:
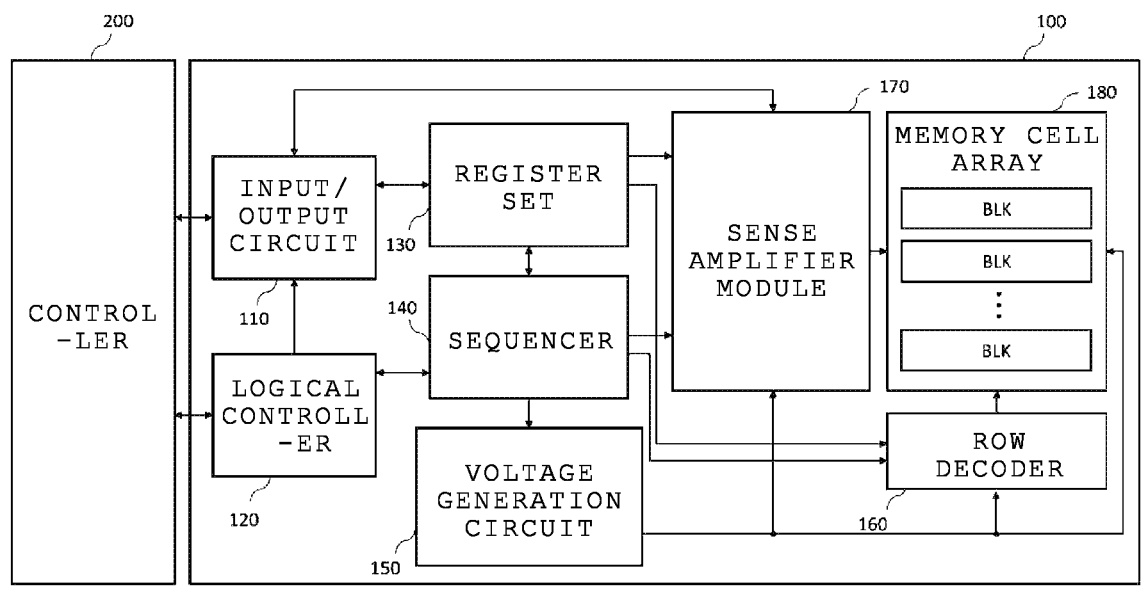
FIG. 2 is a block diagram illustrating a configuration of a non-volatile memory according to the first embodiment.

As illustrated in FIG. 2, the non-volatile memory 100 includes an input/output circuit 110, a logical controller 120, a register set 130, a sequencer 140, a voltage generation circuit 150, a row decoder 160, a sense amplifier module 170, and a memory cell array 180. It is noted that the input/output circuit 110, the logical controller 120, the register set 130, the sequencer 140, the voltage generation circuit 150, the row decoder 160, and the sense amplifier module 170 may be, for example, a portion of the control circuit.

The input/output circuit 110 transmits and receives signals to and from the controller 200. The signals include, for example, data, statuses, addresses, or commands. In addition, the input/output circuit 110 also transmits and receives data to and from the sense amplifier module 170.

The logical controller 120 controls the input/output circuit 110 and the sequencer 140 based on control signals received from the controller 200.

The register set 130 includes, for example, status registers, address registers, and command registers. The status register stores the statuses. The address register stores the addresses. The command register stores the commands.

The sequencer 140 controls the entire operation of the non-volatile memory 100 based on commands stored in the command register. The sequencer 140 controls the row decoder 160, the sense amplifier module 170, and the voltage generation circuit 150 to execute, for example, a write operation, a read operation, and an erasing operation.

Figure 3:
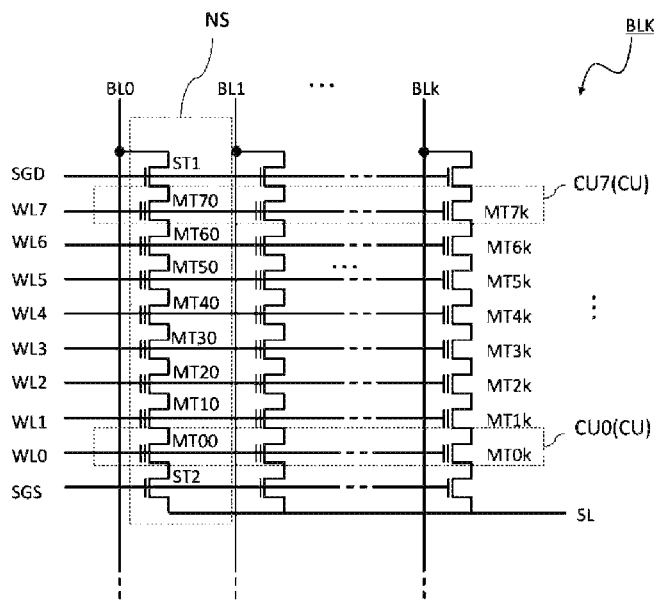
FIG. 3 is a circuit diagram illustrating a configuration of blocks according to the first embodiment.

The voltage generation circuit 150 generates a voltage based on the control by the sequencer 140. The generated voltage is supplied to the row decoder 160, the sense amplifier module 170, and the memory cell array 180. As illustrated in FIG. 3, the voltage generation circuit 150 generates voltages to be applied to the operation targets in word lines WL0 to WL7, the operation targets in bit lines BL0 to BLk, and the operation targets in source lines SL with, for example, the write operation, the read operation, and the erasing operation. The voltage generation circuit 150 supplies the generated voltage to be applied to the word line WL to the row decoder 160. The voltage generation circuit 150 supplies the generated voltage to be applied to the bit line to the sense amplifier module 170. The voltage generation circuit 150 supplies the generated voltage to be applied to the source line SL to the source line SL.

The row decoder 160 receives a row address from the address register and decodes the received row address. The row decoder 160 selects a block BLK which is a target of the operation based on the result of the decoding. The row decoder 160 can transfer the voltage supplied from the voltage generation circuit 150 to the selected block BLK.

The sense amplifier module 170 receives a column address from the address register and decodes the received column address. The sense amplifier module 170 executes a data transfer operation between the input/output circuit 110 and the memory cell array 180 based on the result of the decoding.

The memory cell array 180 has a plurality of the blocks BLK. The block BLK is, for example, a data erase unit. As illustrated in FIG. 3, the block BLK includes a plurality of storage elements associated with the bit lines BL0 to BLk and the word lines WL0 to WL7. In this embodiment, the storage elements are memory cell transistors MT00 to MT70.

The block BLK includes a plurality of NAND strings NS. A NAND string NS is associated with the corresponding bit line among the bit lines BL0 to BLk (k is a natural number). The NAND string NS includes, for example, the memory cell transistors MT00 to MT70 and select transistors ST1 and ST2. The memory cell transistors MT00 to MT70 and MT0$k$ to MT7$k$ include control gates and charge storage layers and store data in a non-volatile manner. Each of the select transistors ST1 and ST2 is used to select the NAND string NS including the select transistors ST1 and ST2 during the operation.

Figure 4:
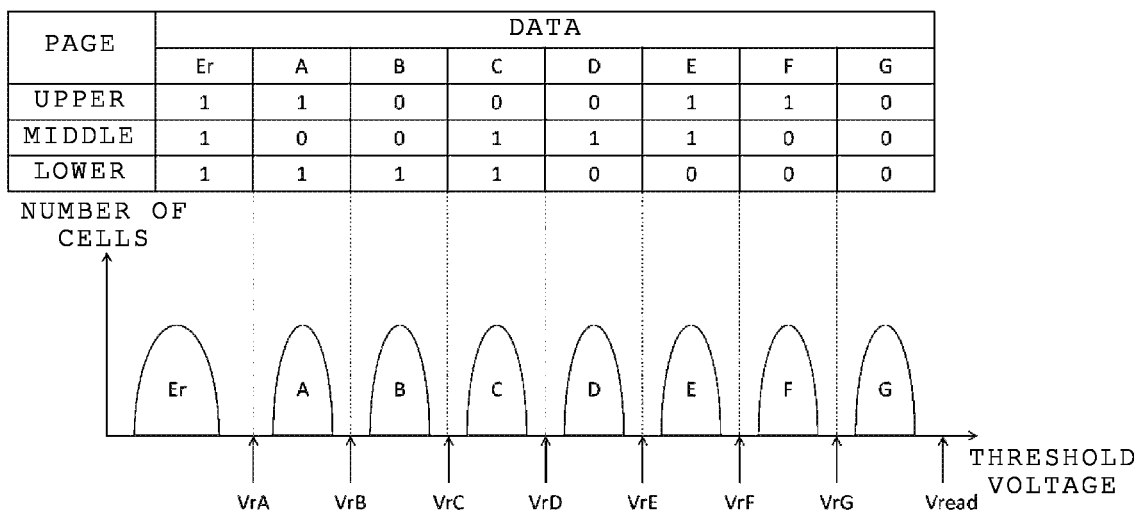
FIG. 4 is a diagram illustrating a relationship between a threshold voltage distribution and a read voltage of the non-volatile memory according to the first embodiment.

In addition, the block BLK includes a plurality of cell units CU. The cell unit CU is, for example, the plurality of memory cell transistors MT commonly connected to the same word line WL. In this embodiment, cell units CU0 to CU7 are provided as illustrated in FIG. 3. As illustrated in FIG. 4, in this embodiment, one memory cell transistor MT can retain 3-bit data. These 3-bit data are referred to as a lower bit, a middle bit, and an upper bit from the lower bit. In addition, for example, a set of identical bits stored in the plurality of memory cell transistors MT of the cell unit CU is defined as a "page". That is, the set of lower bits stored in the cell unit CU may be used as a lower page, the set of the middle bits may be used as a middle page, and the set of the upper bits may be used as an upper page. It is noted that, in this embodiment, the cell unit CU has a storage capacity of three pages. The write operation and the read operation of the data may be performed in units of pages or in units of cell units CU. In this embodiment, a case in which reading is performed in units of cell units CU will be described.

As illustrated in FIG. 4, since the memory cell transistor MT can retain 3-bit data, the eight states can be taken according to the threshold voltage. The eight states that the memory cell transistor MT can take according to the threshold voltage are an "Er" state, an "A" state, a "B" state, a "C" state, a "D" state, an "E" state, an "F" state, and a "G" state in order from the state with the lowest threshold voltage.

The threshold voltage of the memory cell transistor MT in the "Er" state is lower than a read voltage VrA, which corresponds to the data erased state. The threshold voltage of the memory cell transistor MT in the "A" state is equal to or higher than the read voltage VrA and lower than a read voltage VrB (>VrA). The threshold voltage of the memory cell transistor MT in the "B" state is equal to or higher than the read voltage VrB and lower than a read voltage VrC (>VrB). The threshold voltage of the memory cell transistor MT in the "C" state is equal to or higher than the read voltages VrC and lower than a voltage VrD (>VrC). The threshold voltage of the memory cell transistor MT in the "D" state is equal to or higher than the read voltage VrD and lower than the read voltage VrE (>VrD). The threshold voltage of the memory cell transistor MT in the "E" state is equal to or higher than the read voltage VrE and lower than the read voltage VrF (>VrE). The threshold voltage of the memory cell transistor MT in the "F" state is equal to or higher than the read voltage VrF and lower than the read voltage VrG (>VrF). The threshold voltage of the memory cell transistor MT in the "G" state is equal to or higher than the read voltage VrG and lower than the voltage Vread (>VrG). Among the eight states distributed in this manner, the "G" state has the highest threshold voltage. The read voltages VrA to VrG, also referred to as the read voltages Vr are applied to the selected word line WL_sel that is a read target in the read operation. The voltage Vread is, for example, during the read operation, a voltage applied to a non-selected word line WL_usel which is not a target of the read operation and is a voltage that turns on the memory cell transistor MT regardless of the stored data.

A threshold voltage distribution is implemented by writing 3-bit data of the lower bit, the middle bit, and the upper bit. That is, the relationship of the 3-bit data from the "Er" state to the "G" state can be expressed as follows. It is noted that the upper bit, the middle bit, and the lower bit are illustrated in this order. The "Er" state: "111", the "A" state: "101", the "B" state: "001", the "C" state: "011", the "D" state: "010", the "E" state: "110", the "F" state: "100", and the "G" State: "000", and therefore, only one bit among 3 bits changes between the data corresponding to 2 adjacent states in the threshold voltage distribution. Therefore, when reading the lower bit, the read voltage VrD, which is the voltage corresponding to the boundary where the value of the lower bit changes, needs to be used. It is noted that the same applies to the middle bit and the upper bit. It is noted that, in this embodiment, although the memory cell transistor MT has been described as being capable of storing 3-bit data, this embodiment is not limited thereto. The memory cell transistor MT may be capable of storing 1-bit data or 2-bit data or may be capable of storing 4-bit or more data.

In describing the write operation of this embodiment, first, a standard write operation will be described with reference to FIGS. 5 and 6. The write operation is a loop operation that repeatedly performs a combination of a program operation and a verify operation. FIGS. 5 and 6 illustrate an example in which data are written by repeating the loop operation nineteen times. In this embodiment, due to the loop operation, the write operation performed as illustrated in FIGS. 5 and 6 is allowed to be the standard write operation. It is noted that the number of times of repeating of the loop operation is set as the number of loops. A program voltage VPGM increases every time when the number of loops increases. That is, a program voltage VPGM2 of the second loop is higher than a program voltage VPGM1 of the first loop. In addition, a verify voltage Vfy has verify voltages VfyA to VfyG corresponding to the "A" state to the "G" state of the memory cell transistor MT, respectively.

As illustrated in FIG. 5, in the first and second loops, the verify operation is performed only on the "A" state as a target. That is, during the verify operation, the verify voltage VfyA is applied to the selected word line WL_sel, and the verify voltages VfyB to VfyG are not applied. In the third and fourth loops, the verify operation is performed on the "A" state and the "B" state as targets. That is, the verify voltages VfyA and VfyB are sequentially applied to the selected word line WL_sel during the verify operation, and the verify voltages VfyC to VfyG are not applied.

In the fifth and sixth loops, the verify operation is performed on the "A" state, the "B" state, and the "C" state as targets. That is, during the verify operation, the selected word line WL_sel is sequentially applied with the verify voltages VfyA, VfyB, and VfyC, and the verify voltages VfyD to VfyG are not applied. Then, with the sixth loop, the verify operation on the "A" state as a target is completed. This is because it is empirically required that programming to the "A" state is almost completed in, for example, six loops.

In addition, in the seventh and eighth loops, the verify operation is performed on the "B" state, the "C" state, and the "D" state as targets. That is, during the verify operation, the verify voltages VfyB, VfyC, and VfyD are sequentially applied to the selected word line WL_sel. Then, the verify operation on the "B" state as a target is completed with the eighth write operation. Furthermore, in the ninth and tenth loops, the verify operation is performed on the "C" state, the "D" state, and the "E" state as targets. That is, during the verify operation, the verify voltages VfyC, VfyD, and VfyE are sequentially applied to the selected word line WL_sel. Then, with the tenth loop, the verify operation on the "C" state as a target is completed. After that, writing of the "G" state is performed in the same manner, and the loop is repeated nineteen times at maximum.

As illustrated in FIG. 6, in the first and second loops, the verify operation is performed only on the "A" state as a target. That is, one verify operation is performed on one program operation. In the third and fourth loops, the verify operation is performed on the "A" state and the "B" state as targets. That is, the verify operations are performed two times on one program operation. In the fifth to twelfth loops, the verify operation is performed three times on one program operation. After that, the set predetermined level of the verify operation is performed on one program operation. Finally, when the loop is repeated nineteen times, the program operation is performed nineteen times, and the verify operation is performed forty three times.

It is noted that the verify operation is assumed to be performed up to the upper limit number of times. As illustrated in FIG. 5, the verify operation on the "A" state as a target can be executed up to six times at maximum from the first loop to the sixth loop. In addition, the verify operation on the "B" state as a target can be executed up to six times at maximum from the third loop to the eighth loop. The same applies to other states. Herein, for example, there are the plurality of memory cell transistors MT to be written in the "A" state. Therefore, strictly speaking, for example, in some cases, when all the memory cell transistors MT written to the "A" state pass the verify operation on the "A" state as a target in the fifth loop, the verify operation may not be executed in the sixth loop. This also applies to the following description.

It is noted that the voltage VPGM1 applied to the selected word line WL_sel in the first program operation, the amount of increase in the voltage VPGM in the second and subsequent program operations, and the number of the loop in which the verify operation starts at each level are set by assuming the worst case in which writing is fast, and a sufficient margin is secured so that writing exceeding the target level is not performed. In other words, the number of the loop may be changed as needed to suit the circumstances of the write operation.

Next, the erasing operation and the write operation according to this embodiment will be described with reference to FIGS. 7 to 15.

As illustrated in FIG. 7, the controller 200 receives, for example, an erasing operation command from the host 2 and performs an erasing operation on the block BLK (S110). When the erasing operation is performed, the threshold voltage distribution of the memory cell transistors MT of the block BLK which is a target of the erasing operation goes into "Er" state.

The controller 200 measures a feature data for each cell unit CU provided in the block BLK which is a target of the erasing operation (S130). For example, the characteristics of the cell unit CU are monitored by measuring the feature data. The feature data is related to the deterioration degree of the memory cell transistor MT. In this embodiment, the feature data is the threshold voltage distribution width of the memory cell transistor MT. For example, it is considered that the wider the threshold voltage distribution width of the memory cell transistor MT in the "Er" state after the erasing operation, the higher the deterioration degree of the memory cell transistor MT.

In this embodiment, when measuring the feature data, the read operation is performed on the cell units CU provided in the block BLK which is a target of the erasing operation. For example, as illustrated in FIG. 8, the read voltages Vr are changed from the read voltage VrA to the read voltages VrA1, VrA2, VrA3, . . . , VrAn−1, and VrAn, and the threshold voltage distribution width of the memory cell transistor MT in the "Er" state is measured. It is noted that the read voltage VrA1 is the read voltage VrA−ΔVrA. The read voltage VrA2 is the read voltage VrA−2ΔVrA. Similarly, the read voltage VrAn is the read voltage VrA−nΔVrA. By changing the read voltages Vr, the width of the threshold voltage distribution width of the memory cell transistors MT of the cell unit CU provided in the block BLK which is a target of the erasing operation is measured.

It is noted that, in the measurement of the threshold voltage distribution width of the memory cell transistor MT, the method of applying the read voltage Vr is not limited to the above. When the deterioration degree of the memory cell transistor MT is high, in some cases, the number of times of application of the erase voltage in one erasing operation may increase. Therefore, in the erasing operation of S110, the read voltage Vr to be applied first may be selected according to the number of times of application of the erase voltage. The read voltages Vr to be applied may be spaced at regular intervals such as the read voltages VrA, VrA2, VrA4, . . . .

The controller 200 performs the classification on the cell units CU based on the feature data measured in S130 (S150). In the deterioration degree management table illustrated in FIG. 9, the deterioration degree of the cell unit CU provided in each of the plurality of blocks BLK is managed. For this reason, when the classification is performed, the classification is recorded in the deterioration degree management table.

For example, in this embodiment, the controller 200 performs the classification on the cell unit CU into one of the first to fifth states. When the widest threshold voltage distribution width among the memory cell transistors MT provided in the cell unit CU is smaller than a first width W1, the cell unit CU is classified into the first state. When the widest threshold voltage distribution width among the memory cell transistors MT provided in the cell unit CU is smaller than a second width W2 (>W1), the cell unit CU is classified into the second state. When the widest threshold voltage distribution width among the memory cell transistors MT provided in the cell unit CU is smaller than the third width W3 (>W2), the cell unit CU is classified into a third state. When the widest threshold voltage distribution width among the memory cell transistors MT provided in the cell unit CU is smaller than a fourth width W4 (>W3), the cell unit CU is classified into the fourth state. When the widest threshold voltage distribution width among the memory cell transistors MT provided in the cell unit CU is equal to or larger than the fourth width W4, the cell unit CU is classified into the fifth state.

The controller 200 sets parameters for the write operation based on the deterioration degree management table (S170).

The controller 200 performs the write operation based on the set parameters (S190). As illustrated in FIG. 10, the verify operation in the write operation differs according to the set parameters.

For example, in the write operation on the cell unit CU classified into the first state as a target, all the verify operations are omitted as illustrated in FIG. 11. That is, in the write operation, when the loop is repeated nineteen times, the program operation is performed nineteen times, and the verify operation is performed zero times.

In the write operation on the cell units CU classified into the second state as a target, the verify operation is performed only on the "A" state and the "B" state as targets as illustrated in FIG. 12. Since the first to fourth loops are the same as the standard write operation in FIG. 5, the description thereof is omitted. In the fifth and sixth loops, the verify operation is performed on the "A" state and the "B" state as targets. That is, during the verify operation, the verify voltages VfyA and VfyB are sequentially applied to the selected word line WL_sel, and the verify voltages VfyC to VfyG are not applied. In the seventh and eighth loops, the verify operation is performed only on the "B" state as a target. That is, the verify voltage VfyB is applied to the selected word line WL_sel. Therefore, as illustrated in FIG. 13, only the program operation is performed after the ninth loop. That is, when the loop is repeated nineteen times, the program operation is performed nineteen times, and the verify operation is performed twelve times.

Figure 15:
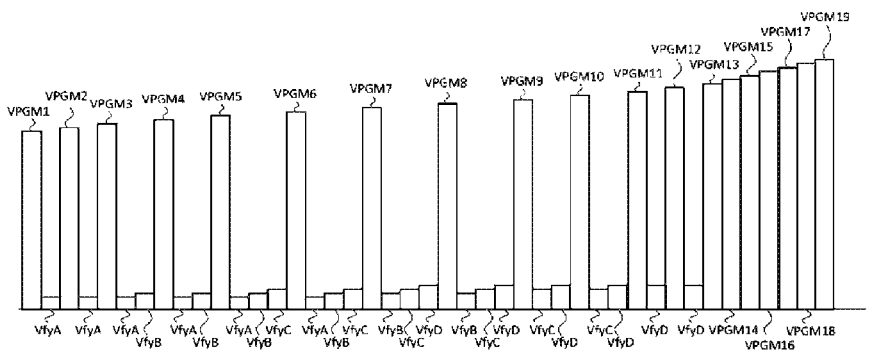
FIG. 15 is a diagram illustrating timings of the program operation and the verify operation in the write operation based on the third state.

In the write operation for the cell units CU, as targets, classified into the third state, as illustrated in FIG. 14, the verify operation is performed only on the "A" state, "B" state, "C" state, and "D" state as targets. Since the first to eighth loops are the same as the standard write operation in FIG. 5, the description is omitted. In the ninth and tenth loops, the verify operation is performed on the "C" state and the "D" state as targets. That is, during the verify operation, the verify voltages VfyC and VfyD are sequentially applied to the selected word line WL_sel. In the eleventh and twelfth loops, the verify operation is performed only on the "D" state as a target. That is, the verify voltage VfyD is applied to the selected word line WL_sel. Therefore, as illustrated in FIG. 15, only the program operation is performed after the thirteenth loop. That is, when the loop is repeated nineteen times, the program operation is performed nineteen times and the verify operation is performed twenty four times.

In the write operation for the cell units CU classified into the fourth state as a target, the standard write operation as illustrated in FIG. 5 is performed. That is, the verify operation is not omitted.

In the write operation on the cell units CU classified into the fifth state, as a target, for example, the standard write operation is performed similarly to the fourth state. In addition, for example, when half of the cell units CU in the block BLK are classified into the fifth state, the block BLK is regarded as a defective block. In this case, the block BLK in which half of the cell units CU are classified into the fifth state is excluded from targets of the write operation. Therefore, no write operation is performed on the block BLK in which half of the cell units CU are classified into the fifth state. In addition, in the write operation on the cell units CU classified into the first to fifth states described above, as a target, the block BLK is not regarded as a defective block. In addition, when half of the cell units CU in the block BLK are classified into the fifth state, the block BLK is regarded as a defective block, but the number of cell units CU in the block BLK that is regarded as a defective block is not limited thereto.

Thus, the erasing operation and the write operation in this embodiment are completed.

It is noted that, although the number of classifications is five in this embodiment, the number may be four or less or may be six or more. In addition, the choice of which verify operation is to be omitted may be freely determined according to each classification. For example, in the write operation for the cell units CU classified as the second state, the verify operation may be performed only in the sixth, twelfth, and eighteenth loops. In the write operation for the cell units CU classified into the third state, the verify operation may be performed only in the fourth, eighth, twelfth, and sixteenth loops. In the write operation for the cell units CU classified into the fourth state and the fifth state, the verify operation may be performed only in even-numbered loops.

In addition, in this embodiment, the feature data is measured each time when the erasing operation is performed, but this embodiment is not limited thereto. For example, the feature data may be measured when the number of erase voltage applications within one erasing operation is changed. The feature data may be measured when the erasing operation is performed a certain number of times.

According to this embodiment, the feature data of the memory cell transistor MT is measured for each cell unit CU, which is a write unit, the deterioration degree of the memory cell transistor MT is monitored based on the feature data, and the cell units CU can be classified. For this reason, the write operation can be changed according to the deterioration degree of the cell unit of the write unit, and the reliability of the memory system 1 can be improved. In addition, in the write operation for the memory cell transistor MT having a low deterioration degree, the time related to the write operation can be shortened by omitting the number of times of the verify operation.

Modification 1 of First Embodiment

In modification 1, the feature data is the median value of the threshold voltage distribution width of the memory cell transistors MT. S110 in FIG. 7 is the same as in the first embodiment. In S130, in this modification, similarly to the first embodiment, first, the controller 200 obtains the threshold voltage distribution width of the memory cell transistor MT. Then, the median value of the threshold voltage distribution width is obtained based on the measurement of the threshold voltage distribution width of the memory cell transistors MT. From the above, the median value of the threshold voltage distribution width of the memory cell transistors MT, which is the feature data in this embodiment, is measured.

The controller 200 performs classification of the cell units CU based on the feature data measured in S130 (S150). For example, the classification is performed according to how much the median value of the threshold voltage distribution width of the memory cell transistors MT provided in the cell unit CU deviates from the first reference value. Specifically, when the threshold voltage distribution width of the memory cell transistors MT provided in the cell unit CU deviates from the first reference value by a first value M1, the cell unit CU is determined to be in the first state. It is noted that, in this embodiment, the first reference value is the threshold voltage distribution width in the case of the normal distribution as illustrated in FIG. 4. When the threshold voltage distribution width of the memory cell transistors MT provided in the cell unit CU deviates from the first reference value by a second value M2 (>M1), the cell unit CU is determined to be in the second state. When the threshold voltage distribution width of the memory cell transistors MT provided in the cell unit CU deviates from the first reference value by a third value M3 (>M2), the cell unit CU is determined to be in the third state. When the threshold voltage distribution width of the memory cell transistors MT provided in the cell unit CU deviates from the first reference value by a fourth value M4 (>M3), the cell unit CU is determined to be in the fourth state. When the threshold voltage distribution width of the memory cell transistors MT provided in the cell unit CU deviates from the first reference value by a fifth value M5 (>M4), the cell unit CU is determined to be in the fifth state.

Since the processes after S170 are the same as those in the first embodiment, the description of the processes after S170 are omitted. Thus, the erasing operation and write operation in this embodiment are completed.

Modification 2 of First Embodiment

A difference from the first embodiment is the timing of measuring the feature data. Hereinafter, only the difference from the first embodiment will be described.

In modification 2, the timing of measuring the feature data is before performing the write operation. A preliminary write operation is performed before performing the write operation and after performing the erasing operation. In the preliminary write operation, the write operation is a weaker write operation than the standard write operation performed to reduce the influence of data retention. The "data retention" is a term used to describe a decrease in the threshold voltage distribution of the memory cell transistor MT as time passes or as a result of the environment such as temperature changes.

The write operation according to this embodiment will be described with reference to FIGS. 16 and 17.

Figure 16:
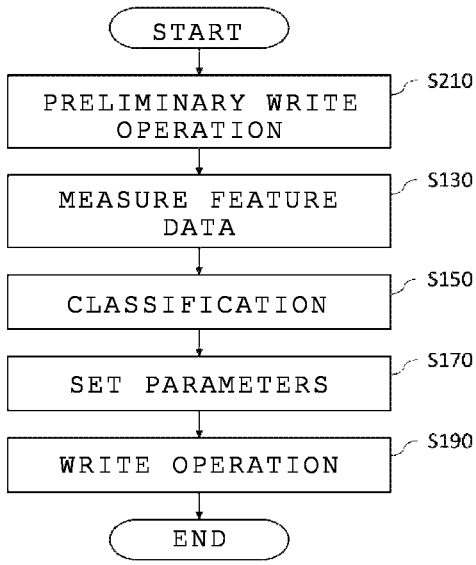
FIG. 16 is a flow chart of a write operation according to a modification of the first embodiment.
Figure 17:
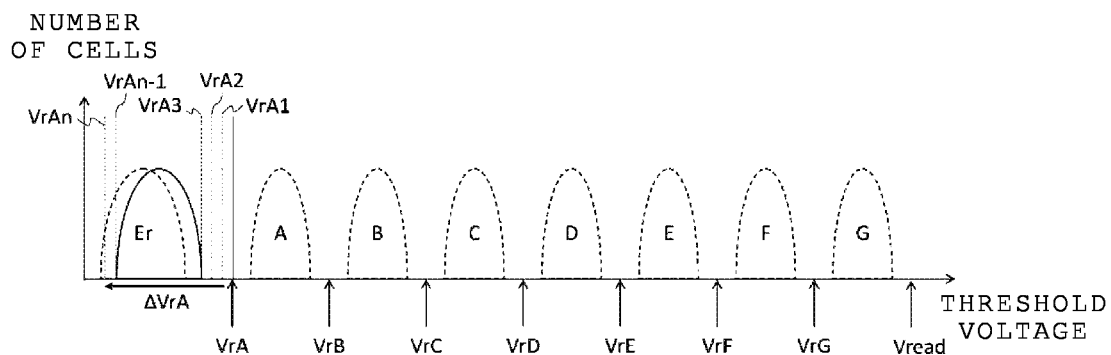
FIG. 17 is a schematic diagram of a threshold voltage distribution of a non-volatile memory according to a modification of the first embodiment.

As illustrated in FIG. 16, the controller 200 receives a write operation command, for example from the host 2, and performs the preliminary write operation on the block BLK (S210). By performing the preliminary write operation, as illustrated in FIG. 17, the threshold voltage distribution in the "Er" state indicated by the dotted line changes to the threshold voltage distribution indicated by the solid line. It is noted that, since the preliminary write operation is performed to reduce the influence of data retention, the state does not change from the "Er" state to the "A" state or the like.

The controller 200 measures the feature data for each cell unit CU provided in the block BLK which is a target of the preliminary write operation (S130). In this embodiment, similarly to the first embodiment, the feature data is the threshold voltage distribution width of the memory cell transistor MT. For example, it is considered that the wider the threshold voltage distribution width of the memory cell transistor MT in the "Er" state after the preliminary write operation, the higher the deterioration degree of the memory cell transistor MT. It is noted that, since the description of S130 to S190 is the same as that in the first embodiment, the description is omitted.

Thus, the preliminary write operation and the write operation in this embodiment are completed.

Modification 3 of First Embodiment

In modification 3, similarly to modification 2, the preliminary write operation is performed before the write operation and after the erase operation. In addition, similarly to modification 1, the feature data is the median value of the threshold voltage distribution width of the memory cell transistors MT. S210 in FIG. 16 is the same as in modification 2. In S130, in this embodiment, similarly to the first embodiment, first, the controller 200 obtains the threshold voltage distribution width of the memory cell transistor MT. Then, the median value of the threshold voltage distribution width is obtained based on the measurement of the threshold voltage distribution width of the memory cell transistors MT. From the above, the median value of the threshold voltage distribution width of the memory cell transistors MT, which is the feature data in this embodiment, is measured.

Since the processes after S150 are the same as those in the first embodiment, the description thereof is omitted. As described above, the write operation in this embodiment is completed.

Second Embodiment

A second embodiment differs from the first embodiment in that classification is performed by using artificial intelligence (hereinafter, referred to as AI).

Figure 18:
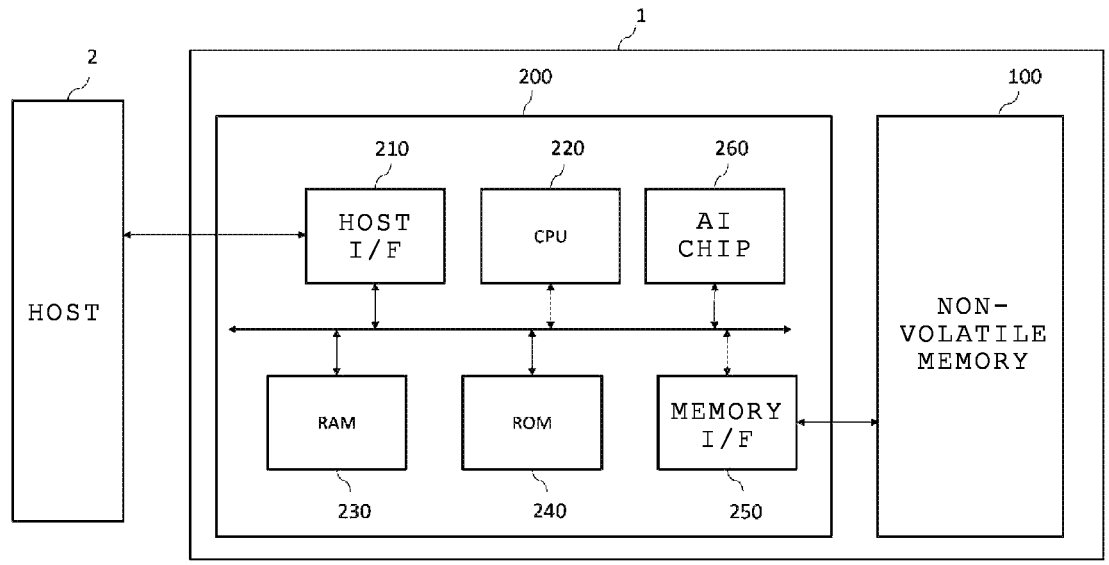
FIG. 18 is a block diagram illustrating a configuration of a memory system according to a second embodiment.

As illustrated in FIG. 18, a memory system 1 includes a non-volatile memory 100 and a controller 200. The controller 200 includes, for example, a host I/F 210, a CPU 220, a RAM 230, a ROM 240, a memory I/F 250, and an AI chip 260.

The AI chip 260 is a semiconductor chip for speeding up an AI arithmetic process. The AI arithmetic process includes, for example, a learning process of generating combination patterns of features from statistics of a huge amount of data and an identification process of identifying input data based on the patterns generated by the learning process. In this embodiment, for example, the AI chip 260 performs the learning process in advance to generate the combination patterns of various threshold voltage distributions of the memory cell transistors MT and the deterioration degrees of the memory cell transistors MT. For this reason, in this embodiment, the AI chip 260 performs the identification process. It is noted that the AI chip 260 may be software. Although the AI chip is provided in the controller 200, the AI chip may be provided outside the controller 200.

Figure 19:
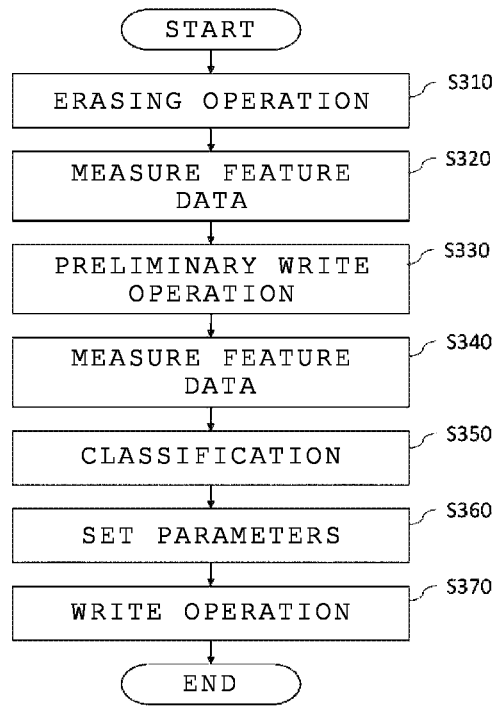
FIG. 19 is a flow chart of a write operation according to the second embodiment.

Next, the erasing operation and the write operation according to this embodiment will be described with reference to FIG. 19. The controller 200 receives, for example, the erasing operation command from the host 2 and performs the erasing operation on the block BLK (S310). When the erasing operation is performed, the threshold voltage distribution of the memory cell transistors MT of the block BLK which is a target of the erasing operation goes into "Er" state.

The controller 200 measures the feature data for each cell unit CU provided in the block BLK which is a target of the erasing operation (S320). In this embodiment, the feature data is the threshold voltage distribution width of the memory cell transistors MT or the median value of the threshold voltage distribution width of the memory cell transistors MT.

The controller 200 receives, for example, the write operation command from the host 2 and performs the preliminary write operation for the block BLK (S330). The influence of the data retention by the preliminary write operation can be reduced.

The controller 200 measures the feature data for each cell unit CU which is a target of the preliminary write operation (S340).

The controller 200 outputs the classification of the cell unit CU setting the feature data measured in S320 and S340 as input data by using the AI chip 260 (S350).

The controller 200 sets the parameters for the write operation from the classification output from the AI chip 260 based on the deterioration degree management table (S360). Example of parameters are shown in FIG. 10. The parameters may be referred to as operation patterns.

The controller 200 performs the write operation based on the set parameters (S370). Thus, the erasing operation and the write operation in this embodiment are completed.

It is noted that, in this embodiment, the threshold voltage distribution width of the memory cell transistor MT and the median value of the threshold voltage distribution width of the memory cell transistors MT are set as the feature data, the result itself read using the read voltages VrA, VrA1, VrA2, . . . , and VrAn, in S320 and S340, may be used as the feature data. Any one of the threshold voltage distribution width of the memory cell transistor MT, the median value of the threshold voltage distribution width of the memory cell transistors MT, and the results of reading by using the read voltages VrA, VrA1, VrA2, . . . , and VrAn may be used. In addition, any one of the feature data measurement after the erasing operation (S320) and the feature data measurement after the preliminary write operation (S340) may be performed.

Therefore, as the feature data to be input to the AI chip 260, at least one of the threshold voltage distribution width of the memory cell transistors MT of the cell unit CU provided in the block BLK which is a target of the erasing operation, the median value of the threshold voltage distribution width of the memory cell transistors MT provided in the block BLK which is a target of the erasing operation, the result of reading the cell units CU provided in the block BLK which is a target of the erasing operation by using the read voltages VrA, VrA1, VrA2, . . . , and VrAn, the threshold voltage distribution width of the memory cell transistors MT of the cell unit CU which are targets of the preliminary write operation, the median value of the threshold voltage distribution width of the memory cell transistors MT of the cell unit CU which are targets of the preliminary write operation, and the result of reading the cell units CU which are targets of the preliminary write operation by using the read voltages VrA, VrA1, VrA2, and VrAn may be input.

According to this embodiment, the same effects as those of the first embodiment can be obtained. In addition, by performing the classification by using the AI chip 260, an irregular and complicated shape of the threshold voltage distribution that is not close to a normal distribution can be dealt with.

For example, when the lower edge of the threshold voltage distribution spreads as indicated by the solid line in FIG. 20, the actual threshold voltage distribution of the memory cell transistor MT is less likely to be acquired by measuring the threshold voltage distribution width of the memory cell transistor MT. In addition, when there are a plurality of vertexes of the threshold voltage distribution as indicated by the solid line in FIG. 21, the actual threshold voltage distribution of the memory cell transistor MT is less likely to be acquired by measuring the threshold voltage distribution width of the memory cell transistor MT or the median value of the threshold voltage distribution width of the memory cell transistors MT. When the threshold voltage distribution is divided into a plurality of portions as illustrated by the solid line in FIG. 22, the actual threshold voltage distribution of the memory cell transistor MT is less likely to be acquired by measuring the threshold voltage distribution width of the memory cell transistor MT or the median value of the threshold voltage distribution width of the memory cell transistors MT.

Although the shape of the threshold voltage distribution is hard to acquire as described above, since there is a learning process of generating combination patterns of various threshold voltage distributions of the memory cell transistor MT and the deterioration degrees of the memory cell transistors MT in advance in the AI chip 260, it becomes easier to obtain the actual threshold voltage distribution of the memory cell transistors MT. Therefore, as compared with the first embodiment, more accurate classification can be performed on various shapes of threshold voltage distributions.

(Modification)

Figure 24:
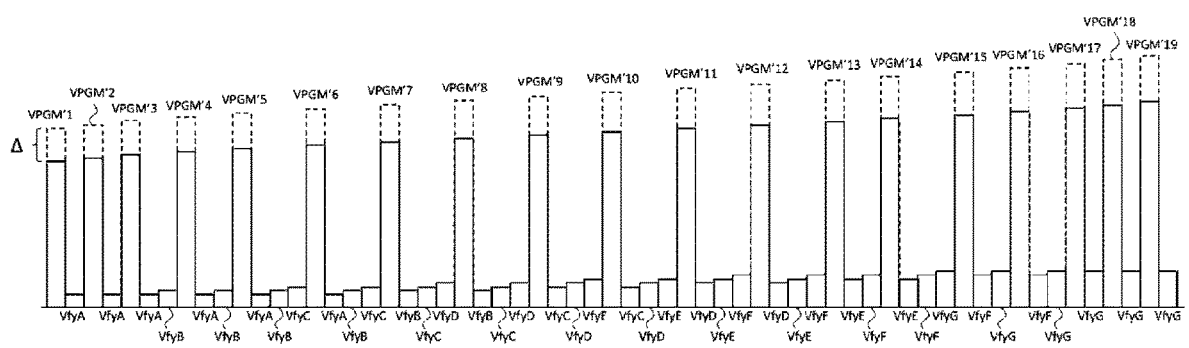
FIG. 24 is a diagram illustrating timings of a program operation and a verify operation in a write operation according to a modification.

In the first and second embodiments, the verify operation in the write operation is changed according to the classification, but this embodiment is not limited thereto. As illustrated in FIGS. 23 and 24, the program voltage VPGM may be changed. It is considered that the wider the threshold voltage distribution width of the memory cell transistor MT in the "Er" state after the erasing operation or the preliminary write operation, the higher the deterioration degree of the memory cell transistor MT. When the deterioration degree of the memory cell transistor MT is high, in order to accurately write the target data, the program voltage VPGM for one loop can be lowered. In addition, when the deterioration degree of the memory cell transistor MT is high, for example, the number of loops may be decreased.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor storage device comprising:
a non-volatile memory provided with a block including a plurality of memory cell transistors connected to a word line; and
a controller configured to monitor a threshold voltage distribution width of the plurality of memory cell transistors after performing an erasing operation on the block by applying a plurality of read voltages and to classify the plurality of memory cell transistors according to the threshold voltage distribution width of the plurality of memory cell transistors, wherein:
when the threshold voltage distribution width among the plurality of memory cell transistors is smaller than a first width, the controller classifies the plurality of memory cell transistors to be in a first state;
when the threshold voltage distribution width among the plurality of memory cell transistors is larger than the first width and is smaller than a second width larger than the first width, the controller classifies the plurality of memory cell transistors to be in a second state; and
when the threshold voltage distribution width among the plurality of memory cell transistors is larger than the second width and is smaller than a third width larger than the second width, the controller classifies the plurality of memory cell transistors to be in a third state, and further wherein:
the controller is further configured to control a write operation performed on the plurality of memory cell transistors according to a state thereof;
the write operation is a repeating loop operation that includes a program operation and no verify operation after the program operation or a combination of the program operation and the verify operation performed after the program operation, and a number of the verify operations performed in each loop operation is controlled by the controller according to the state of the plurality of memory cell transistors on which the write operation is performed;
when the controller determines that the plurality of the memory cell transistors is in the first state, the total number of the verify operations performed in the write operation is zero,
when the controller determines that the plurality of the memory cell transistors is in the second state, the total number of the verify operations performed in the write operation is n (n>O), and
when the controller determines that the plurality of the memory cell transistors is in the third state, the total number of the verify operations performed in the write operation is m (m>n).

2. The semiconductor storage device according to claim 1, wherein:
when the threshold voltage distribution width among the plurality of memory cell transistors is larger than the third width and is smaller than a fourth width larger than the third width, the controller classifies the plurality of memory cell transistors to be in a fourth state;
when the threshold voltage distribution width among the plurality of memory cell transistors is larger than the fourth width, the controller classifies the plurality of memory cell transistors to be in a fifth state;
when the controller determines that the plurality of memory cell transistors is in the fourth state, the total number of the verify operations performed in the write operation is l (l>m); and
when the controller determines that the plurality of memory cell transistors is in the fifth state, the total number of the verify operations performed in the write operation is k (k≥1).

3. The semiconductor storage device according to claim 2, wherein, when half of the plurality of memory cell transistors in the block are determined to be in the fifth state, the controller regards the block as a bad block.

4. The semiconductor storage device according to claim 3, wherein, when the controller regards the block to be a bad block, the write operation on the block is not performed.

5. The semiconductor storage device according to claim 2, wherein l is equal to k and none of the verify operations are omitted in the fourth state and in the fifth state.

6. The semiconductor storage device according to claim 1, wherein the non-volatile memory includes a table, and the controller is further configured to store the state of the plurality of memory transistors in the table.

7. The semiconductor storage device according to claim 6, wherein the controller is further configured to control the total number of the verify operations performed in the write operation according to the state of the plurality of memory transistors stored in the table.

8. The semiconductor storage device according to claim 1, wherein the plurality of the read voltages includes a first voltage, a second voltage, and a third voltage, and a difference between the second voltage and the first voltage is the same as a difference between the second voltage and the third voltage.

* * * * *